United States Patent
Morita

(10) Patent No.: US 6,850,838 B2
(45) Date of Patent: Feb. 1, 2005

(54) NAVIGATION SYSTEM

(75) Inventor: Hiroyuki Morita, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 126 days.

(21) Appl. No.: 10/074,031

(22) Filed: Feb. 14, 2002

(65) Prior Publication Data

US 2002/0152019 A1 Oct. 17, 2002

(30) Foreign Application Priority Data

Feb. 14, 2001 (JP) ........................................ 2001-036685

(51) Int. Cl.⁷ ................................................. A63C 7/00
(52) U.S. Cl. ....................... 701/207; 701/211; 701/213; 701/301
(58) Field of Search ................................ 701/207, 204, 701/209, 213, 300, 301, 302, 715, 214, 211, 216; 342/357.01, 357.06, 357.08, 357.09, 357.1, 357.12, 450

(56) References Cited

U.S. PATENT DOCUMENTS

| | | | | |
|---|---|---|---|---|
| 6,038,502 A | | 3/2000 | Sudo | |
| 6,275,773 B1 | * | 8/2001 | Lemelson | 701/301 |
| 6,405,132 B1 | * | 6/2002 | Breed et al. | 701/301 |
| 6,456,941 B1 | * | 9/2002 | Gutierrez | 701/301 |
| 6,487,500 B2 | * | 11/2002 | Lemelson | 701/301 |
| 6,654,687 B1 | * | 11/2003 | Gutierrez | 701/300 |

* cited by examiner

Primary Examiner—Richard M. Camby
(74) Attorney, Agent, or Firm—Birch, Stewart, Kolasch & Birch, LLP

(57) ABSTRACT

To provide a navigational system which allows each user to easily recognize the relative positional relationship with other navigational systems. The navigational system includes a positional information generating section for detecting current position and generating positional information. A transmitting/receiving section is provided for transmitting a first positional information and receiving positional information from other navigational systems. A storage section stores the positional information of the other navigational systems. A relative position determining section is provided for determining a relative positional relationship including a relative distance between the navigational system and the other navigational systems on the basis of the positional information of the navigational system and the other navigational systems. A display panel displays the relative positional relationship.

19 Claims, 4 Drawing Sheets

NAVIGATION SYSTEM

CROSS-REFERENCE TO RELATED APPLICATIONS

The present application claims priority under 35 USC 119 to Japanese Patent Application No. 2001-036685 filed on Feb. 14, 2001 the entire contents thereof is hereby incorporated by reference.

BACKGROUND OF THE INVENTION

1. Field of the Invention

The present invention relates generally to a navigational system and, more particularly, to a navigational system for exchanging positional information between a plurality of navigational systems.

2. Description of Background Art

When driving a plurality of vehicles as a group, the distances between the vehicles always change depending on the road situations and the needs of each driver. Therefore, it becomes a matter of concern for each driver whether the relative distance between the vehicles is within an easy reach or not for example, depending on picking up of the pace of one vehicle or slowing down of the pace of another. If the relative distance becomes too large, each driver must adjust the pace so as not to stray away from the group.

In order to satisfy such driver's needs as above, a capability of displaying the current position of a first vehicle and the current position of another vehicle on a map screen has been proposed as a part of a so-called party capability for example.

In recognizing the position of another vehicle by each driver in a group, it is most important for each driver to know the relative bearing or distance with other vehicles rather than knowing where the other vehicles are located on the map.

However, in the above-mentioned related art, only the current positions of a first vehicle and the other vehicles are displayed on a map screen, so that, in order to know the distance with any other member in a group, the actual distance must be computed on the basis of the distance and a display scale on the map display.

SUMMARY AND OBJECTS OF THE INVENTION

It is therefore an object of the present invention to provide a navigational system which allows each driver in a group to easily recognize the positional relationship with other navigational systems.

In carrying out the invention and according to one aspect thereof, there is provided a navigational system for detecting a current position to generate positional information, including: transmitting means for transmitting positional information of the navigational system; receiving means for receiving positional information of other navigational systems; relative position determining means for determining a relative positional relationship including a relative distance between the navigational system and the other navigational systems on the basis of the positional information of the navigational system and the other navigational systems; and display means for displaying the relative positional relationship.

According to the above-mentioned novel constitution, the navigational system installed on each vehicle displays the relative distance between a first vehicle and another vehicle, so that each driver can recognize the interval in between in a quantitative manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
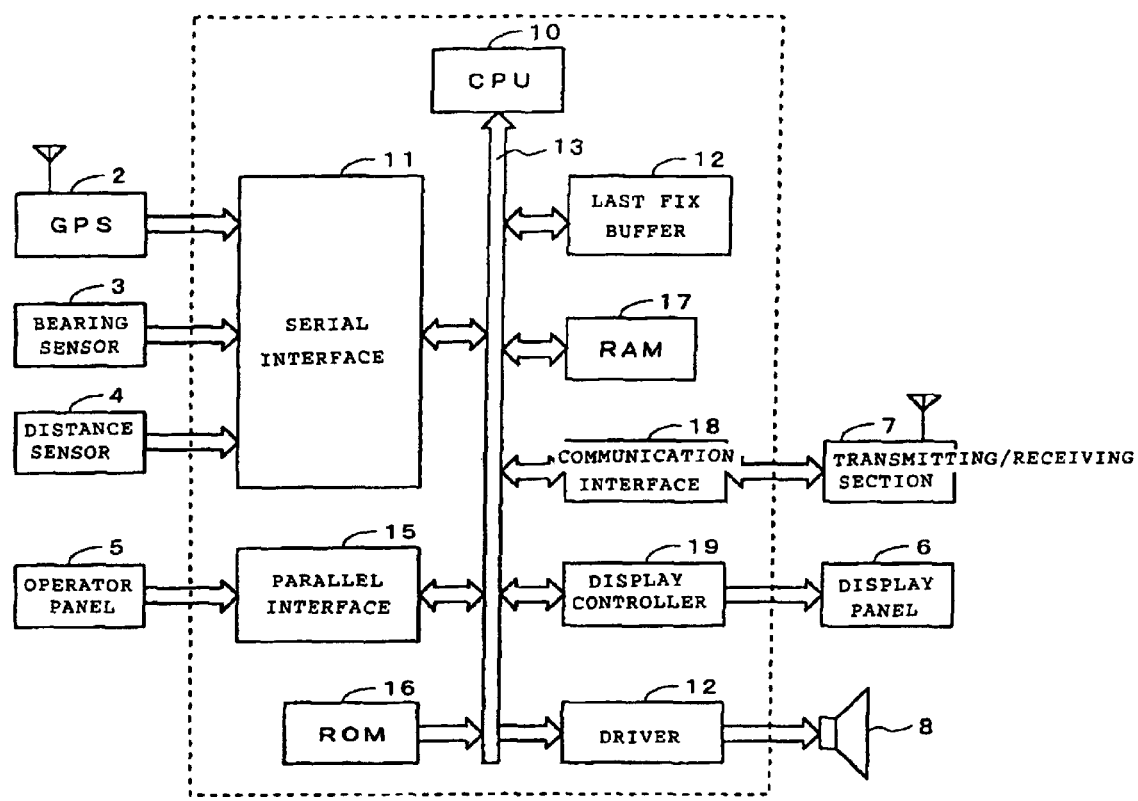
FIG. 1 is a block diagram illustrating a circuit configuration of the main section of a navigational system to which the present invention is applied.

This invention will be described in further detail by way of example with reference to the accompanying drawings. Now, referring to FIG. 1, there is shown a block digram illustrating a circuit configuration of the main section of a navigational system to which the present invention is applied. In what follows, an example in which the present invention is embodied in a motor bicycle will be described.

A GPS (Global Positioning System) 2 receives signals from artificial satellites to measure the current position (longitude and latitude) of the vehicle. A bearing sensor 3 detects the current position and bearing of the first vehicle. A distance sensor 4 detects a travel distance of the vehicle. The GPS 2, the bearing sensor 3, and the distance sensor 4 are connected to a system bus 13 via a serial interface 11.

An operator panel 5 has a scroll button for setting destinations for example and operator buttons for setting a limit distance Lmax to be described later and the information for identifying other navigational systems with which relative distances to be obtained for example and is connected to the system bus 13 via a parallel interface 15.

On the basis of the information captured from the GPS 2, the bearing sensor 3, and the distance sensor 4 and a control program stored in a ROM 16, a CPU 10 obtains the current position of the vehicle. A RAM 17 provides a work area to the CPU 10. Further, the CPU 10 computes the direction of a destination as viewed from the current position, the distance from the current position to the destination, and the like and displays the obtained information on a display panel 6 via a display controller 19. A last fix buffer 12 stores the positional information supplied from the CPU 10 in a periodical manner.

A transmitting/receiving section 7 transmits the positional information associated with the current position of the first vehicle obtained by the CPU 10 to the other navigational systems along with the first identification information. In addition, the transmitting/receiving section 7 receives the positional information of the other vehicles having navigational systems transmitted therefrom and their identification information and stores the received information into the RAM 17 via a communication interface 18.

Figure 2:
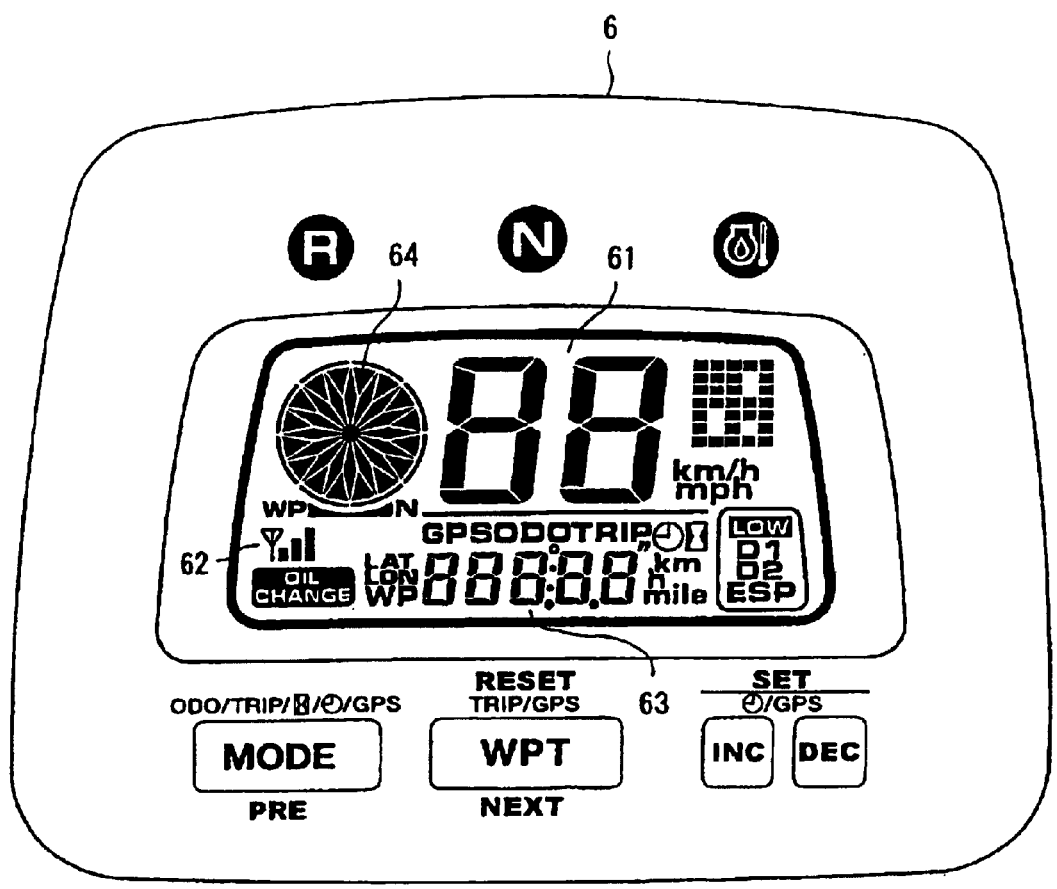
FIG. 2 is a diagram illustrating a configuration of a display panel 6.

FIG. 2 illustrates a configuration of the display panel 6. As shown, the display panel has a speed display section 61, a GPS receiving status display section 62, a section 63 which functions as an odometer and trip meter and displays the relative distance with other navigational system installed vehicles, and a section 64 which displays the direction of destination and the directions of the other navigational system installed vehicles in 16 bearings. It should be noted that the other display contents are not necessary for the understanding of the present invention and therefore their description will be skipped.

Figure 3:
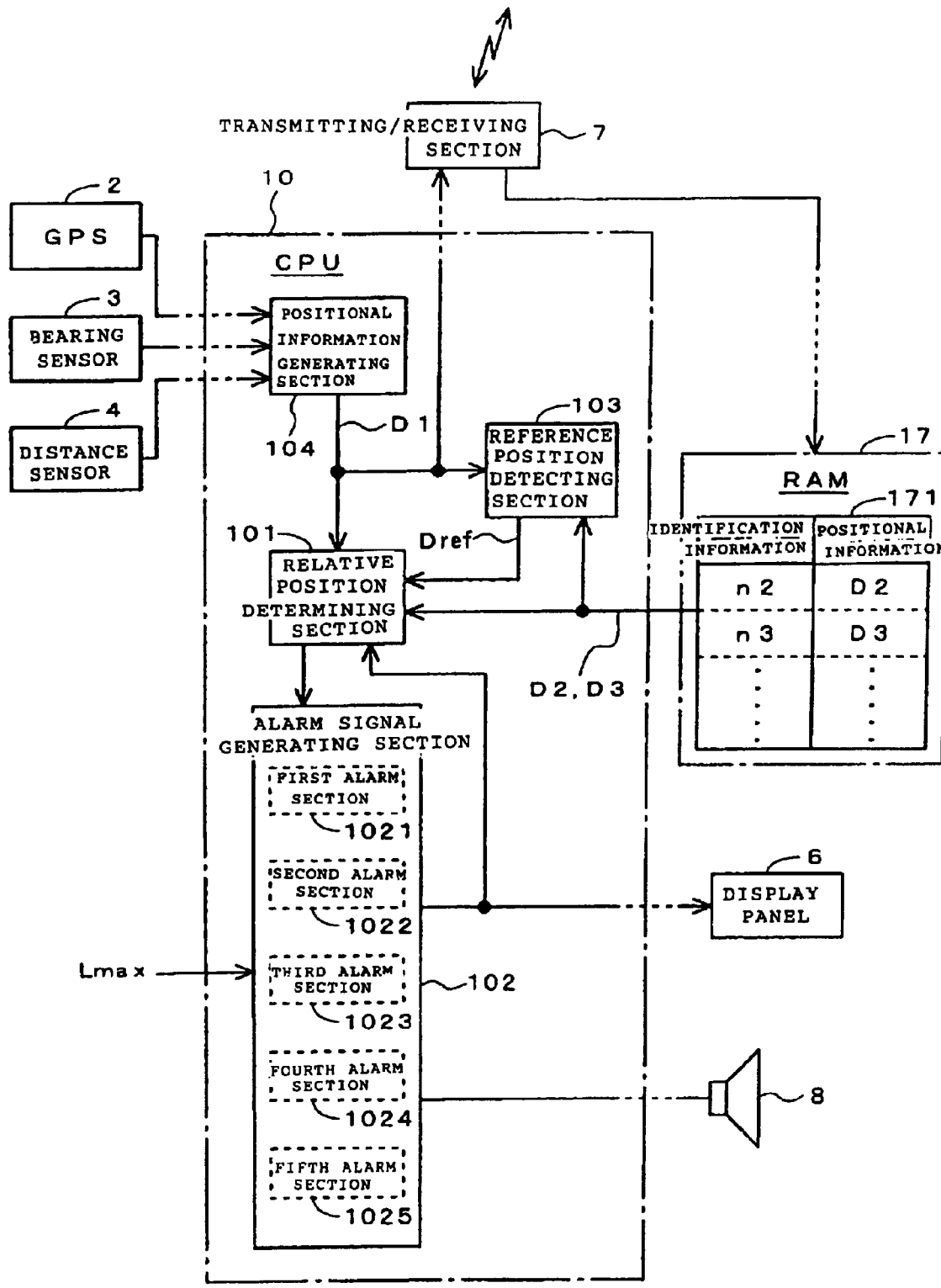
FIG. 3 is a block diagram illustrating a configuration of the present invention.

FIG. 3 is a block diagram functionally illustrating the main section of the present invention. With reference to FIG. 3, components similar to those described with reference to FIG. 1 are denoted by the same references.

Figure 4:
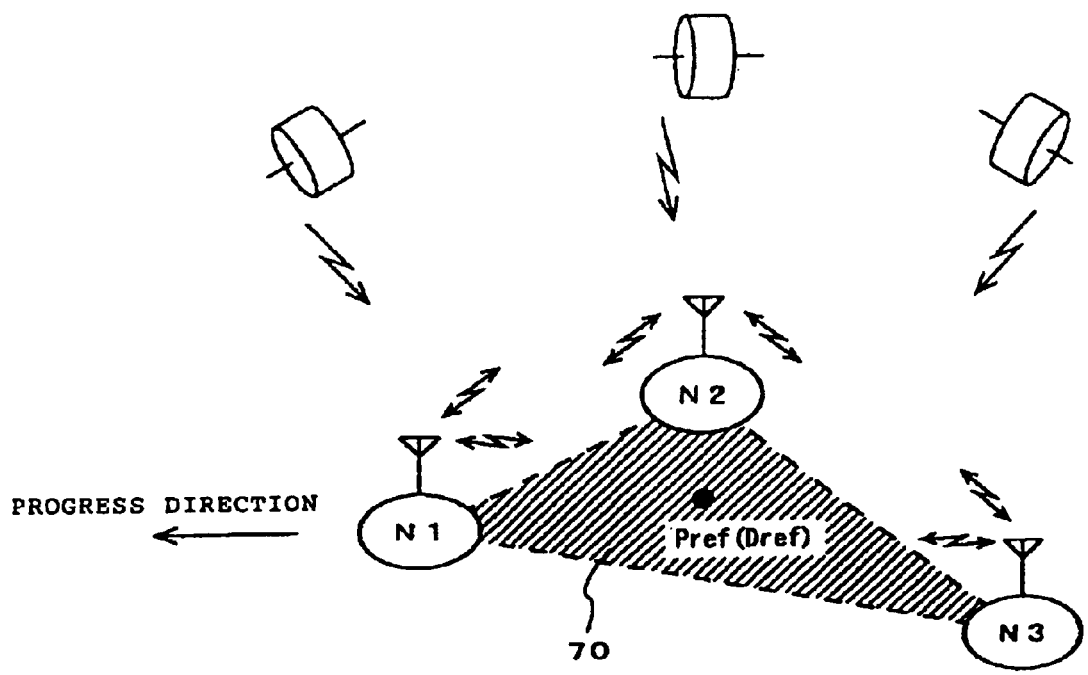
FIG. 4 is a diagram illustrating an exemplary application of the present invention.

The description of the present invention uses an example in which three vehicles have navigational systems N1, N2, and N3 respectively as shown in FIG. 4. It should be noted that these navigational systems have the same configuration; therefore only the navigational system N1 will be representatively described.

Referring to FIG. 3, a positional information storage section 171 of the RAM 17 stores positional information D2 and D3 of the other navigational systems N2 and N3 received by the transmitting/receiving section 7, in association with identification information n2 and n3. The positional information includes the information associated with longitude, latitude, altitude, and their detection time.

In the CPU 10, a positional information generating section 104 generates positional information D1 on the basis of the current position of the first vehicle (the navigational system N1). A reference position detecting section 103 detects positional information Dref of predetermined reference position Pref on the basis of the positional information D2 an D3 stored in the positional information storage section 171 of the RAM 17 and positional information D1 of the first vehicle outputted from the positional information generating section 104.

A relative position determining section 101 determines the relative positions between the navigational systems N1, N2, N3, and the reference position Pref on the basis of positional information D1, D2, D3, and Dref. An alarm signal generating section 102 generates an alarm signal on the basis of limit distance Lmax inputted from the operator panel 5, the relative distances Ln1–n2, Ln2–n3, and Ln3–n1 between the navigational systems N1, N2, and N3 determined by the relative position determining section 101, and the relative distances Ln1–r, Ln2–r, and Ln3–r between the navigational systems N1, N2, and N3 and the preference position Pref.

The reference position detecting section 103 sets, as the reference position Pref, the center of gravity of an area 70 enclosed by the current positions of all navigational systems N1, N2, and N3 as shown by the dotted line in FIG. 4, for example.

In the configuration as described above, the navigational system N1 periodically obtains the current position through the positional information generating section 104 and outputs the obtained current position along with the allocated identification information n1 as positional information D1. This positional information D1 is transmitted from the transmitting/receiving section 7 and, at the same time, supplied to the relative position determining section 101.

Further, the navigational system N1 receives the positional information D2 and D3 transmitted from the other navigational systems N2 and N3 and their identification information n2 and n3 at the transmitting/receiving section 7 and stores the received information into the positional information storage section 171 for updating.

The relative position determining section 101 obtains relative distances Ln1–n2, Ln2–n3, and Ln3–n1 between the navigational systems N1, N2, and N3 and the relative distances Ln1–r, Ln2–r and Ln3–r between the navigational systems N1, N2, and N3 and the reference position Pref. Then, the relative position determining section 101 outputs the information associated with the relative position between the other navigational systems specified from the operator panel and the first navigational system to the display panel 6 via the display controller 19.

Figure 5:
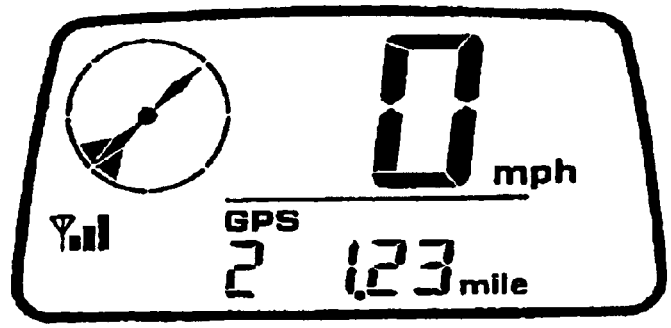
FIG. 5 is a diagram illustrating an exemplary display of the relative distance with another navigational system.

FIG. 5 illustrates an exemplary display of the display panel 6 associated with the above-mentioned relative distance. In the present embodiment, the display panel shows that the vehicle having identification number "2" (for example, the vehicle installed with the navigational system N2) is located at the 2 o'clock direction and the relative distance between the first vehicle and the vehicle of identification number "2" is 1.23 miles.

Consequently, according to the present embodiment, the relative distance between the first vehicle and other vehicles having navigational systems can be numerically represented, so that each driver can recognize the relative positional relationships between the vehicles in a quantitative manner.

Referring to FIG. 3 again, the relative position determining section 101 outputs relative distances Ln1–n2, Ln2–n3, Ln3–n1 and Ln1–r, Ln2–r, and Ln3–r between all navigational systems including the first navigational system N1, N2 and N3 and the reference position Pref detected by the reference position detecting section 103 to the alarm signal generating section 102.

If relative distances Ln1–n2 and Ln3–n1 between the first navigational system (N1) and the other navigational systems N2 and N3 increase to be greater from the limit position Lmax inputted from the operator panel 5, a first alarm section 1021 of the alarm signal generating section 102 displays the identification number of the deviating navigational system and the relative distance therewith on the display panel 6 and sounds an alarm from a speaker 8.

If the relative distance Ln1-r between a first navigational system and the reference position Pref exceeds the limit distance Lmax, a second alarm section 1022 sounds an alarm from the speaker 8.

If the relative distances Ln2–r and Ln3–r between the other navigational systems N2 and N3 and the reference position Pref exceed the limit distance Lmax, a third alarm section 1023 displays the identification number of the deviating navigational system and the relative distance therewith on the display panel 6 and sounds an alarm from the speaker 8.

If the relative distance between the first navigational system and the navigational system nearest to the first navigational system (in the example shown in FIG. 4, the relative distance Ln1–n2 with the navigational system N2) exceeds the limit distance Lmax, a fourth alarm section 1024 displays the identification number of the nearest navigational system and the relative distance therewith on the display panel 6 and sounds an alarm from the speaker 8.

If the relative distance between the heading navigational system and the trailing navigational system with respect to the progress direction (in the example shown in FIG. 4, the relative distance Ln1–n3 between the navigational system N1 and N3) exceeds the limit distance Lmax, a fifth alarm section 1025 sounds an alarm from the speaker 8.

As described above, according to the present embodiment, an alarm is given whenever any of the relative distances between the navigational systems gets out of a predetermined range, thereby preventing the first or any other members in a group from straying away from the group.

In the above-mentioned embodiment, each navigational system directly mutually transfers positional information with others. It will be apparent that a public switched wireless communication network (for example, a PHS communication network or a cellular phone network) may be used as communication means, thereby communicating with each other via a base station of the network.

In the above-mentioned embodiment, each navigational system uses the GPS as a positioning device. It will be apparent that a system using an autonomous navigator or a loran navigator or a combination thereof may also be used as far as these navigators measure absolute positions.

In the above-mentioned embodiment, each navigational system is an in-vehicle system. It will be apparent that the present embodiment can also be embodied as a simplified navigational system which is carried by climbers or hikers for example.

As described and according to the invention, the following effects are achieved:

The relative distances with other movable bodies each having a navigational system can be numerically represented. This allows the user to recognize the relative positional relationships with other movable bodies in a quantitative manner.

If the relative distance between the navigational systems gets away from a predetermined distance, an alarm is issued. This prevents the first or other members of a group from straying.

Use of a public switched wireless network such as PHS or cellular phone network by each navigational system for telling each other's current position enhances general versatility.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigational system for detecting a current position to generate positional information, comprising:
   transmitting means for transmitting positional information of said navigational system;
   receiving means for receiving positional information of other navigational systems;
   relative position determining means for determining a relative positional relationship including a relative distance between said navigational system and said other navigational systems on the basis of the positional information of said navigational system and said other navigational systems; and
   display means for displaying said relative positional relationship, and said display means also displaying identification information corresponding to said other navigational systems when a distance between said navigational system and said other navigational systems has exceeded a predetermined limit distance set by an operator.

2. The navigational system according to claim 1, wherein said transmitting means transmits identification information of said navigational system along with said positional information thereof, said receiving means receives the positional information of said other navigational systems along with said identification information thereof, and said display means displays said relative positional relationship between said navigational system and said other navigational systems along with said identification information of said other navigational systems.

3. The navigational system according to claim 1, and further comprising an alarm generating means for generating an alarm signal when said relative positional relationship between said navigational system and said other navigational systems becomes a predetermined relationship.

4. The navigational system according to claim 2, and further comprising an alarm generating means for generating an alarm signal when said relative positional relationship between said navigational system and said other navigational systems becomes a predetermined relationship.

5. The navigational system according to claim 3, wherein said alarm generating means generates an alarm signal when said relative distance between said navigational system and said other navigational systems has exceeded said predetermined limit distance.

6. The navigational system according to claim 4, wherein said alarm generating means generates an alarm signal when said relative distance between said navigational system and said other navigational systems has exceeded said predetermined limit distance.

7. The navigational system according to claim 3, and further comprising a reference position detecting means for detecting a predetermined reference position on the basis of the positional information of said navigational system and said other navigational systems, wherein said alarm generating means generates an alarm signal when a relative distance between said reference position and a current position of said navigational system has exceeded said predetermined limit distance.

8. The navigational system according to claim 4, and further comprising a reference position detecting means for detecting a predetermined reference position on the basis of the positional information of said navigational system and said other navigational systems, wherein said alarm generating means generates an alarm signal when a relative distance between said reference position and a current position of said navigational system has exceeded said predetermined limit distance.

9. A navigational system for detecting a current position to generate positional information, comprising:
   transmitting means for transmitting positional information of said navigational system:
   receiving means for receiving positional information of other navigational systems:
   relative position determining means for determining a relative positional relationship including a relative distance between said navigational system and said other navigational systems on the basis of the positional information of said navigational system and said other navigational systems:
   reference position detecting means for detecting a predetermined reference position on the basis of the positional information of said navigational system and said other navigational system, and display means for displaying said relative positional relationship.

10. The navigational system according to claim 4, and further comprising a reference position detecting means for detecting a predetermined reference position on the basis of the positional information of said navigational system and said other navigational systems, wherein said alarm generating means generates an alarm signal when a relative distance between a current position of any one of said other navigational systems and said reference position has exceeded said limit distance.

11. The navigational system according to claim 3, wherein said alarm generating means generates an alarm signal when a relative distance between said navigational system and any one of said other navigational systems that is nearest to said navigational system has exceeded said predetermined limit distance.

12. The navigational system according to claim 4, wherein said alarm generating means generates an alarm signal when a relative distance between said navigational system and any one of said other navigational systems that is nearest to said navigational system has exceeded said predetermined limit distance.

13. The navigational system according to claim 3, wherein said alarm generating means generates an alarm signal when a relative distance between the navigational system which heads in a progress direction and the navigational system which trails in the progress direction has exceeded said limit distance.

14. The navigational system according to claim 4, wherein said alarm generating means generates an alarm signal when a relative distance between the navigational system which heads in a progress direction and the navigational system which trails in the progress direction has exceeded said limit distance.

15. The navigational system according to claim 1, wherein said transmitting means and said receiving means transfer said positional information via a base station.

16. The navigational system according to claim 2, wherein said transmitting means and said receiving means transfer said positional information via a base station.

17. The navigational system according to claim 3, wherein said transmitting means and said receiving means transfer said positional information via a base station.

18. The navigational system according to claim 4, wherein said transmitting means and said receiving means transfer said positional information via a base station.

19. The navigational system according to claim 9, wherein said display means displays identification information corresponding to said other navigational systems when a distance between said navigational system and said other navigational systems has exceeded a predetermined limit distance, the predetermined limit distance being set by an operator of the navigational system.

* * * * *